US009674651B2

(12) United States Patent
Madsen

(10) Patent No.: US 9,674,651 B2
(45) Date of Patent: *Jun. 6, 2017

(54) PORTABLE COMPUTING DEVICE WITH DATA ENCRYPTION AND DESTRUCTION

(71) Applicant: Apogee Technology Consultants, LLC, Boca Raton, FL (US)

(72) Inventor: John J. Madsen, Henderson, NV (US)

(73) Assignee: APOGEE TECHNOLOGY CONSULTANTS, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/955,761

(22) Filed: Jul. 31, 2013

(65) Prior Publication Data
US 2013/0314270 A1    Nov. 28, 2013

Related U.S. Application Data

(63) Continuation of application No. 13/644,537, filed on Oct. 4, 2012, now Pat. No. 8,600,405, which is a
(Continued)

(51) Int. Cl.
*G08B 1/08* (2006.01)
*H04W 4/02* (2009.01)
(Continued)

(52) U.S. Cl.
CPC ............... *H04W 4/02* (2013.01); *G01S 19/16* (2013.01); *G01S 19/34* (2013.01); *G01S 19/42* (2013.01);
(Continued)

(58) Field of Classification Search
CPC ..................................................... H04W 4/02
(Continued)

(56) References Cited

U.S. PATENT DOCUMENTS 5,659,595 A   8/1997   Chanu et al.
5,675,755 A   10/1997  Trueblood
(Continued)

FOREIGN PATENT DOCUMENTS

DE    102008048011    6/2010
EP    1 170 969       1/2002
(Continued)

OTHER PUBLICATIONS

U.S. Appl. No. 14/658,143 Office Action mailed May 16, 2016.
(Continued)

*Primary Examiner* — Kerri McNally
(74) *Attorney, Agent, or Firm* — Polsinelli LLP

(57) ABSTRACT

A device and software utilizing Global Positioning Satellite (GPS) technologies for monitoring and recovering portable computing devices and, a method and system for acquiring such devices, protecting data on such devices, and for compensating owners of devices. A GPS mechanism of the invention provides real time tracking of missing devices that may be coordinated with security agencies to intercept and recover missing computing devices. When a stolen device is unrecoverable, the invention may receive a signal to initiate data recovery where a wireless network is available to recover data for the owner. Alternatively, the GPS mechanism instructs the device to encrypt or destroy stored data files to prevent commercial espionage or privacy violations. The invention discloses a software system and method for computing a purchase price of the GPS mechanism, computing compensation for loss of the device and lost data.

20 Claims, 5 Drawing Sheets

Related U.S. Application Data continuation-in-part of application No. 12/461,482, filed on Aug. 12, 2009, now Pat. No. 8,427,305.

(60) Provisional application No. 61/188,727, filed on Aug. 12, 2008.

(51) Int. Cl.

| | |
|---|---|
| *G01S 19/16* | (2010.01) |
| *G01S 19/34* | (2010.01) |
| *G01S 19/42* | (2010.01) |
| *G06F 21/88* | (2013.01) |
| *G06F 21/60* | (2013.01) |
| *G06Q 40/08* | (2012.01) |
| *H04W 12/12* | (2009.01) |
| *H04W 12/02* | (2009.01) |
| *G06F 21/62* | (2013.01) |
| *G01S 19/35* | (2010.01) |

(52) U.S. Cl.
 CPC .......... *G06F 21/60* (2013.01); *G06F 21/6218* (2013.01); *G06F 21/88* (2013.01); *G06Q 40/08* (2013.01); *H04W 12/02* (2013.01); *H04W 12/12* (2013.01); *G01S 19/35* (2013.01)

(58) Field of Classification Search
 USPC .................................................. 340/539.13
 See application file for complete search history.

(56) References Cited

U.S. PATENT DOCUMENTS

| | | | |
|---|---|---|---|
| 5,715,174 A | 2/1998 | Cotichini et al. | |
| 5,748,084 A * | 5/1998 | Isikoff | G01S 5/04 340/5.74 |
| 5,790,201 A | 8/1998 | Antos | |
| 5,793,283 A | 8/1998 | Davis | |
| 5,802,157 A | 9/1998 | Clarke et al. | |
| 5,802,280 A | 9/1998 | Cotichini et al. | |
| 5,812,132 A | 9/1998 | Goldstein | |
| 5,905,949 A | 5/1999 | Hawkes et al. | |
| 5,926,091 A | 7/1999 | Svensson et al. | |
| 5,936,526 A | 8/1999 | Klein | |
| 5,945,915 A | 8/1999 | Cromer et al. | |
| 6,011,473 A | 1/2000 | Klein | |
| 6,025,774 A | 2/2000 | Forbes | |
| 6,032,257 A | 2/2000 | Olarig et al. | |
| 6,049,269 A | 4/2000 | Byrd et al. | |
| 6,064,305 A | 5/2000 | Lockyer | |
| 6,087,937 A | 7/2000 | McCarthy | |
| 6,131,067 A | 10/2000 | Girerd et al. | |
| 6,138,005 A | 10/2000 | Park | |
| 6,145,004 A | 11/2000 | Walsh | |
| 6,154,790 A | 11/2000 | Pruett et al. | |
| 6,172,606 B1 | 1/2001 | Lockyer | |
| 6,249,217 B1 | 6/2001 | Forbes | |
| 6,259,367 B1 | 7/2001 | Klein | |
| 6,263,440 B1 | 7/2001 | Pruett et al. | |
| 6,266,533 B1 | 7/2001 | Zadeh et al. | |
| 6,269,392 B1 | 7/2001 | Cotichini et al. | |
| 6,298,228 B1 | 10/2001 | Singh | |
| 6,300,863 B1 | 10/2001 | Cotichini et al. | |
| 6,311,291 B1 | 10/2001 | Barrett | |
| 6,433,685 B1 | 8/2002 | Struble et al. | |
| 6,437,809 B1 | 8/2002 | Nason et al. | |
| 6,448,928 B1 | 9/2002 | Knox et al. | |
| 6,453,461 B1 | 9/2002 | Chaiken | |
| 6,463,276 B1 | 10/2002 | Jonsson | |
| 6,480,096 B1 | 11/2002 | Gutman et al. | |
| 6,507,914 B1 | 1/2003 | Cain et al. | |
| 6,513,060 B1 | 1/2003 | Nixon et al. | |
| 6,542,076 B1 | 4/2003 | Joao | |
| 6,553,497 B1 | 4/2003 | Challener et al. | |
| 6,581,107 B1 | 6/2003 | Deac | |
| 6,594,254 B1 | 7/2003 | Kelly | |
| 6,598,094 B1 | 7/2003 | Wollrath et al. | |
| 6,606,662 B2 | 8/2003 | Nagasaki | |
| 6,614,349 B1 | 9/2003 | Proctor et al. | |
| 6,650,622 B1 | 11/2003 | Austerman et al. | |
| 6,661,372 B1 | 12/2003 | Girerd et al. | |
| 6,662,023 B1 | 12/2003 | Helle | |
| 6,668,203 B1 | 12/2003 | Cook et al. | |
| 6,721,403 B1 | 4/2004 | Mandalia | |
| 6,725,379 B1 | 4/2004 | Dailey | |
| 6,728,767 B1 | 4/2004 | Day et al. | |
| 6,771,972 B2 | 8/2004 | McDonnell et al. | |
| 6,774,811 B2 | 8/2004 | Kaufman et al. | |
| 6,782,251 B2 | 8/2004 | Kagay | |
| 6,796,506 B1 | 9/2004 | Pradhan et al. | |
| 6,804,699 B1 | 10/2004 | Hennie | |
| 6,810,420 B1 | 10/2004 | Buse et al. | |
| 6,813,487 B1 | 11/2004 | Trommelen | |
| 6,820,562 B2 | 11/2004 | Zodnick et al. | |
| 6,868,265 B2 | 3/2005 | Zodnick | |
| 6,912,399 B2 | 6/2005 | Zirul et al. | |
| 6,954,147 B1 | 10/2005 | Cromer et al. | |
| 6,975,204 B1 | 12/2005 | Silver | |
| 7,030,810 B1 | 4/2006 | Walters et al. | |
| 7,047,426 B1 | 5/2006 | Andrews et al. | |
| 7,054,624 B2 | 5/2006 | Cocita | |
| 7,068,168 B2 | 6/2006 | Girshovich et al. | |
| 7,089,591 B1 | 8/2006 | Chi | |
| 7,092,943 B2 | 8/2006 | Roese et al. | |
| 7,099,927 B2 | 8/2006 | Cudd et al. | |
| 7,149,208 B2 | 12/2006 | Mattaway et al. | |
| 7,155,742 B1 | 12/2006 | Szor | |
| 7,159,013 B2 | 1/2007 | Cudd et al. | |
| 7,159,149 B2 | 1/2007 | Spiegel et al. | |
| 7,167,912 B1 | 1/2007 | Dhingra | |
| 7,181,195 B2 | 2/2007 | Booth et al. | |
| 7,194,321 B2 | 3/2007 | Sun et al. | |
| 7,200,220 B1 | 4/2007 | Yamo | |
| 7,200,652 B2 | 4/2007 | Cheston et al. | |
| 7,203,158 B2 | 4/2007 | Oshima et al. | |
| 7,203,959 B2 | 4/2007 | Nachenberg et al. | |
| 7,210,164 B1 | 4/2007 | Jandrell | |
| 7,216,348 B1 | 5/2007 | deCarmo | |
| 7,230,534 B2 | 6/2007 | Elledge | |
| 7,249,187 B2 | 7/2007 | Sobel et al. | |
| 7,257,374 B1 | 8/2007 | Creigh | |
| 7,286,522 B2 | 10/2007 | Preston et al. | |
| 7,296,293 B2 | 11/2007 | Isenberg | |
| 7,319,397 B2 | 1/2008 | Chung et al. | |
| 7,336,175 B2 | 2/2008 | Howarth et al. | |
| 7,350,715 B2 | 4/2008 | Pradhan et al. | |
| 7,352,283 B2 | 4/2008 | Velhal et al. | |
| 7,358,506 B2 | 4/2008 | Daniel | |
| 7,389,118 B2 | 6/2008 | Veskivi et al. | |
| 7,409,219 B2 | 8/2008 | Levitan | |
| 7,496,201 B2 | 2/2009 | Westin | |
| 7,568,165 B2 | 7/2009 | Amadio et al. | |
| 7,587,369 B2 | 9/2009 | Ginter et al. | |
| 7,598,855 B2 | 10/2009 | Scalisi et al. | |
| 7,603,110 B2 | 10/2009 | Zellner et al. | |
| 7,603,357 B1 | 10/2009 | Gourdol et al. | |
| 7,623,933 B2 | 11/2009 | Sarosi et al. | |
| 7,664,488 B2 | 2/2010 | Zellner et al. | |
| 7,684,790 B2 | 3/2010 | Cartmell | |
| 7,714,712 B2 | 5/2010 | Emigh et al. | |
| 7,715,824 B2 | 5/2010 | Zhou | |
| 7,725,716 B2 | 5/2010 | Tidwell et al. | |
| 7,728,715 B2 | 6/2010 | Riedel et al. | |
| 7,751,971 B2 | 7/2010 | Chang et al. | |
| 7,780,079 B2 | 8/2010 | Merzlikine et al. | |
| 7,783,281 B1 | 8/2010 | Cook et al. | |
| 7,793,231 B2 | 9/2010 | Berstis et al. | |
| 7,844,247 B2 | 11/2010 | Chen et al. | |
| 7,890,083 B2 | 2/2011 | Chandran | |
| 7,962,551 B2 | 6/2011 | Mukundan et al. | |
| 7,973,657 B2 | 7/2011 | Ayed | |
| 7,983,723 B2 | 7/2011 | Dunko | |
| 8,038,722 B2 | 10/2011 | Ferren et al. | |
| 8,046,588 B2 | 10/2011 | Gibart et al. | |

(56) References Cited

U.S. PATENT DOCUMENTS

| | | |
|---|---|---|
| 8,090,389 B2 | 1/2012 | Tysowski |
| 8,155,667 B2 | 4/2012 | Jang et al. |
| 8,200,238 B2 | 6/2012 | Gildea |
| 8,248,237 B2 | 8/2012 | Fitzgerald et al. |
| 8,332,953 B2 | 12/2012 | Lemieux et al. |
| 8,346,599 B2 | 1/2013 | Sheth et al. |
| 8,427,305 B2 | 4/2013 | Madsen et al. |
| 8,495,700 B2 | 7/2013 | Shahbazi |
| 8,554,176 B2 | 10/2013 | McLean |
| 8,600,405 B2 | 12/2013 | Madsen et al. |
| 8,739,053 B2 | 5/2014 | Chen et al. |
| 8,793,608 B2 | 7/2014 | Sirpal et al. |
| 8,848,924 B2 | 9/2014 | Kohno et al. |
| 8,881,309 B2 | 11/2014 | Schneider et al. |
| 9,026,170 B2 | 5/2015 | Madsen |
| 9,253,308 B2 | 2/2016 | Madsen |
| 9,369,834 B2 * | 6/2016 | Madsen .................. H04W 4/02 |
| 9,369,836 B2 | 6/2016 | Madsen |
| 9,380,415 B2 * | 6/2016 | Madsen .................. H04W 4/02 |
| 9,380,416 B2 * | 6/2016 | Madsen .................. H04W 4/02 |
| 9,392,401 B2 | 7/2016 | Madsen |
| 2002/0024443 A1 | 2/2002 | Hawkins et al. |
| 2002/0052814 A1 | 5/2002 | Ketterer |
| 2002/0103669 A1 | 8/2002 | Sullivan et al. |
| 2002/0188483 A1 | 12/2002 | Fisher |
| 2003/0005060 A1 | 1/2003 | Davidson et al. |
| 2003/0005316 A1 | 1/2003 | Girard |
| 2003/0009313 A1 | 1/2003 | May et al. |
| 2003/0065934 A1 | 4/2003 | Angelo et al. |
| 2003/0119529 A1 | 6/2003 | Hirokawa |
| 2003/0120775 A1 | 6/2003 | York |
| 2003/0135382 A1 | 7/2003 | Marejka et al. |
| 2003/0163396 A1 | 8/2003 | Blankevoort et al. |
| 2003/0163405 A1 | 8/2003 | Wiener et al. |
| 2003/0181219 A1 | 9/2003 | Huang |
| 2003/0227392 A1 | 12/2003 | Ebert et al. |
| 2004/0075539 A1 | 4/2004 | Savoie et al. |
| 2004/0078327 A1 | 4/2004 | Frazier et al. |
| 2004/0095237 A1 | 5/2004 | Chen et al. |
| 2004/0103056 A1 | 5/2004 | Ikeda et al. |
| 2004/0117660 A1 | 6/2004 | Karaoguz et al. |
| 2004/0124239 A1 | 7/2004 | Feld |
| 2004/0153386 A1 | 8/2004 | Eckerdt |
| 2004/0167797 A1 | 8/2004 | Goncalves |
| 2004/0172283 A1 | 9/2004 | Vanderveen |
| 2004/0177156 A1 | 9/2004 | Hahn et al. |
| 2004/0198309 A1 | 10/2004 | Duvall |
| 2004/0203601 A1 | 10/2004 | Morriss et al. |
| 2004/0249705 A1 | 12/2004 | Spencer et al. |
| 2004/0257223 A1 | 12/2004 | Webb |
| 2005/0006468 A1 | 1/2005 | Fandel et al. |
| 2005/0017900 A1 | 1/2005 | Grimm |
| 2005/0027844 A1 | 2/2005 | Hairprasad et al. |
| 2005/0044404 A1 | 2/2005 | Bhansali et al. |
| 2005/0046567 A1 | 3/2005 | Mortenson et al. |
| 2005/0046584 A1 | 3/2005 | Breed |
| 2005/0073389 A1 | 4/2005 | Chandley |
| 2005/0076034 A1 | 4/2005 | Addonisio et al. |
| 2005/0080691 A1 | 4/2005 | Holm-Blagg |
| 2005/0096996 A1 | 5/2005 | Hall et al. |
| 2005/0136949 A1 | 6/2005 | Barnes |
| 2005/0138356 A1 | 6/2005 | Hurwitz |
| 2005/0149741 A1 | 7/2005 | Humbel |
| 2005/0149752 A1 | 7/2005 | Johnson et al. |
| 2005/0187863 A1 | 8/2005 | Whinery et al. |
| 2005/0198107 A1 | 9/2005 | Cuhls et al. |
| 2005/0242181 A1 | 11/2005 | Cunningham et al. |
| 2006/0007039 A1 | 1/2006 | Duvall |
| 2006/0010078 A1 | 1/2006 | Rezvani et al. |
| 2006/0015451 A1 | 1/2006 | Heyer |
| 2006/0021006 A1 | 1/2006 | Rensin et al. |
| 2006/0033616 A1 | 2/2006 | Silva et al. |
| 2006/0055530 A1 | 3/2006 | Wang et al. |
| 2006/0075263 A1 | 4/2006 | Taylor |
| 2006/0075506 A1 | 4/2006 | Sanda et al. |
| 2006/0085478 A1 | 4/2006 | Landau et al. |
| 2006/0122925 A1 | 6/2006 | Wesby |
| 2006/0128460 A1 | 6/2006 | Muir et al. |
| 2006/0161628 A1 | 7/2006 | Nagy et al. |
| 2006/0170588 A1 | 8/2006 | Chang |
| 2006/0176167 A1 | 8/2006 | Dohrmann |
| 2006/0189326 A1 | 8/2006 | Black et al. |
| 2006/0223518 A1 | 10/2006 | Haney |
| 2006/0241996 A1 | 10/2006 | Burger et al. |
| 2006/0253590 A1 | 11/2006 | Nagy et al. |
| 2006/0253904 A1 | 11/2006 | Bhansali et al. |
| 2006/0267575 A1 | 11/2006 | Sampson et al. |
| 2006/0272020 A1 | 11/2006 | Gardner |
| 2007/0004413 A1 | 1/2007 | Mahajan et al. |
| 2007/0005244 A1 | 1/2007 | Nadkarni |
| 2007/0072553 A1 | 3/2007 | Barbera |
| 2007/0094128 A1 | 4/2007 | Rung et al. |
| 2007/0139187 A1 | 6/2007 | Dobosz |
| 2007/0142059 A1 | 6/2007 | Wang |
| 2007/0171059 A1 | 7/2007 | Pistilli |
| 2007/0180207 A1 | 8/2007 | Garfinkle |
| 2007/0199076 A1 | 8/2007 | Rensin et al. |
| 2007/0234427 A1 | 10/2007 | Gardner et al. |
| 2007/0252675 A1 | 11/2007 | Lamar |
| 2008/0004038 A1 | 1/2008 | Dunko |
| 2008/0035722 A1 | 2/2008 | Feld |
| 2008/0076459 A1 | 3/2008 | Shaju |
| 2008/0079581 A1 | 4/2008 | Price |
| 2008/0132243 A1 | 6/2008 | Spalink et al. |
| 2008/0157942 A1 | 7/2008 | Payne |
| 2008/0186162 A1 | 8/2008 | Rajan et al. |
| 2008/0214150 A1 | 9/2008 | Ramer et al. |
| 2008/0235332 A1 | 9/2008 | McChesney et al. |
| 2008/0243721 A1 | 10/2008 | Joao |
| 2008/0285755 A1 | 11/2008 | Camus et al. |
| 2008/0320339 A1 | 12/2008 | McLellan et al. |
| 2009/0015410 A1 | 1/2009 | Puzio et al. |
| 2009/0019293 A1 | 1/2009 | Perlman |
| 2009/0049544 A1 | 2/2009 | Kashi |
| 2009/0064055 A1 | 3/2009 | Chaudri et al. |
| 2009/0079567 A1 | 3/2009 | Patel |
| 2009/0135002 A1 | 5/2009 | Blinnikka et al. |
| 2009/0187433 A1 * | 7/2009 | Nudd ................................ 705/4 |
| 2009/0207014 A1 | 8/2009 | Ayed |
| 2009/0212941 A1 | 8/2009 | Vock et al. |
| 2009/0231125 A1 | 9/2009 | Baldus et al. |
| 2009/0249443 A1 | 10/2009 | Fitzgerald et al. |
| 2009/0249460 A1 * | 10/2009 | Fitzgerald et al. ................ 726/7 |
| 2009/0249497 A1 | 10/2009 | Fitzgerald et al. |
| 2009/0251282 A1 | 10/2009 | Fitzgerald et al. |
| 2009/0253406 A1 | 10/2009 | Fitzgerald et al. |
| 2009/0253408 A1 | 10/2009 | Fitzgerald et al. |
| 2009/0253410 A1 | 10/2009 | Fitzgerald et al. |
| 2010/0138700 A1 | 6/2010 | McLellan et al. |
| 2010/0250460 A1 | 9/2010 | Twitchell |
| 2011/0065375 A1 | 3/2011 | Bradley |
| 2011/0140857 A1 | 6/2011 | Hull et al. |
| 2011/0141276 A1 | 6/2011 | Borghei |
| 2011/0210849 A1 | 9/2011 | Howard et al. |
| 2013/0314270 A1 | 11/2013 | Madsen et al. |
| 2013/0318620 A1 | 11/2013 | Madsen et al. |
| 2013/0318637 A1 | 11/2013 | Madsen et al. |
| 2014/0058760 A1 | 2/2014 | Madsen et al. |
| 2014/0066009 A1 | 3/2014 | Madsen et al. |
| 2014/0066010 A1 | 3/2014 | Madsen et al. |
| 2014/0067432 A1 | 3/2014 | Madsen et al. |
| 2014/0068781 A1 | 3/2014 | Madsen et al. |
| 2014/0073348 A1 | 3/2014 | Madsen et al. |
| 2014/0074516 A1 | 3/2014 | Madsen et al. |
| 2014/0128096 A1 | 5/2014 | Madsen et al. |
| 2014/0141749 A1 | 5/2014 | Madsen et al. |
| 2014/0159874 A1 | 6/2014 | Hull et al. |
| 2015/0319295 A1 | 11/2015 | Madsen |

(56) References Cited

U.S. PATENT DOCUMENTS

2016/0042196 A1    2/2016   Madsen
2016/0337790 A1   11/2016   Madsen

FOREIGN PATENT DOCUMENTS

| EP | 2 264 657 | 10/2010 |
|----|-----------|---------|
| GB | 2 338 101 | 8/1999 |
| GB | 2 348 777 | 10/2000 |
| GB | 2 395 079 | 5/2004 |
| GB | 2 425 763 | 11/2006 |
| JP | 2005-217922 | 8/2005 |
| JP | 2005-223845 | 8/2005 |
| KR | 20040022286 | 3/2004 |
| WO | WO 00/78057 | 12/2000 |
| WO | WO 02/19121 | 3/2002 |
| WO | WO 02/084615 | 10/2002 |
| WO | WO 2004/008268 | 1/2004 |
| WO | WO 2006/105552 | 5/2006 |
| WO | WO 2006/102399 | 9/2006 |
| WO | WO 2007/055558 | 5/2007 |

OTHER PUBLICATIONS

U.S. Appl. No. 13/955,535 Final Office Action mailed Aug. 6, 2015.
U.S. Appl. No. 13/955,822 Final Office Action mailed Aug. 20, 2015.
U.S. Appl. No. 13/955,876 Final Office Action mailed Aug. 5, 2015.
U.S. Appl. No. 13/955,940 Final Office Action mailed Aug. 6, 2015.
U.S. Appl. No. 13/956,025 Final Office Action mailed Aug. 7, 2015.
U.S. Appl. No. 13/956,062 Final Office Action mailed Jul. 22, 2015.
U.S. Appl. No. 14/068,849 Final Office Action mailed Jul. 23, 2015.
U.S. Appl. No. 14/068,914 Final Office Action mailed Jul. 22, 2015.
Global Positioning System—Wikipedia, the free encyclopedia; http://en.wikipedia.org/wiki/GPS; pp. 1-18 Date of Download: Jan. 5, 2015.
U.S. Appl. No. 12/461,482 Office Action mailed Sep. 13, 2012.
U.S. Appl. No. 12/461,482 Office Action mailed Feb. 9, 2012.
U.S. Appl. No. 12/461,482 Office Action mailed Dec. 16, 2011.
U.S. Appl. No. 13/644,537 Office Action mailed May 16, 2013.
U.S. Appl. No. 13/644,537 Office Action mailed Jan. 21, 2015.
U.S. Appl. No. 13/955,623 Final Office Action mailed Aug. 6, 2014.
U.S. Appl. No. 13/955,623 Office Action mailed Jan. 7, 2014.
U.S. Appl. No. 13/955,704 Final Office Action mailed Aug. 11, 2014.
U.S. Appl. No. 13/955,704 Office Action mailed Jan. 28, 2014.
U.S. Appl. No. 13/955,822 Office Action mailed Dec. 31, 2014.
U.S. Appl. No. 13/955,876 Office Action mailed Jan. 22, 2015.
U.S. Appl. No. 13/955,940 Office Action mailed Jan. 22, 2015.
U.S. Appl. No. 13/956,025 Office Action mailed Jan. 21, 2015.
U.S. Appl. No. 13/956,062 Office Action mailed Feb. 24, 2015.
U.S. Appl. No. 14/068,849 Office Action mailed Feb. 4, 2015.
U.S. Appl. No. 14/068,914 Office Action mailed Jan. 30, 2015.
DeMaria; Gone in 6.0 Seconds—It takes only a few seconds for laptops to be hacked or stolen. Find out what you can do to protect your data.(Sep. 30, 2002).
U.S. Appl. No. 14/616,502, John J. Madsen, Location-Based Recovery Device and Risk Management System for Portable Computing Devices and Data, filed Feb. 6, 2015.
U.S. Appl. No. 15/224,062, John J. Madsen, Telemetric Tracking of a Portable Mobile Device, filed Jul. 29, 2016.
U.S. Appl. No. 13/956,025 Office Action mailed Sep. 14, 2016.
U.S. Appl. No. 14/658,143 Final Office Action mailed Sep. 30, 2016.
U.S. Appl. No. 15/224,062 Office Action mailed Sep. 29, 2016.

\* cited by examiner

PORTABLE COMPUTING DEVICE WITH DATA ENCRYPTION AND DESTRUCTION

CROSS-REFERENCE TO RELATED APPLICATIONS

This application is a continuation of U.S. patent application Ser. No. 13/644,537, filed Oct. 4, 2012, which is a continuation-in-part of U.S. patent application Ser. No. 12/461,482, filed Aug. 12, 2009, now issued U.S. Pat. No. 8,427,305, issued Apr. 23, 2013, which claims priority to U.S. Provisional Patent Application No. 61/188,727, filed Aug. 12, 2008, the entire contents of the aforementioned applications are hereby incorporated herein by reference.

BACKGROUND OF THE INVENTION

1. Field of the Invention

The invention relates to a location-based recovery device and risk management system for portable computing devices and data.

2. Related Art

With the advent of telecommunications, it has become useful and desirable for enterprises and individuals to employ various forms of sensors and communications devices to monitor the condition and location of certain assets such as portable computing devices. Advances in digital, electronic and wireless communication devices have extended the range and convenience of portable asset monitoring. Global Positioning Satellites (GPS) such as Inmarstat, Iridium, Globalstar, or Msat now increase the accuracy of portable asset location and movement. Such technologies are significant in improving efficiency and economic management of portable assets. Such devices and business practices are well known in the prior art.

There are approximately a dozen disclosures describing GPS features that relate to portable device theft and recovery that constitutes the known prior art relating to the present invention. The present invention provides novel and useful improvements, methods and processes for reducing economic and property losses related to the theft or loss of portable computing devices which, without limitation, is distinguished from the prior art in the following discussion.

In U.S. Patent Publication No. 2006/0007039, a method and system are disclosed for expanding law enforcement recovery efforts for missing vehicles using VHF enabled networks and concealed GPS receivers. The present invention application is distinguished in that its hardware elements are novel and unique to the small dimensions of a portable computing device. A further limitation of the prior art is that it substantially provides only passive tracking capabilities. An improvement of this invention over the prior art is the novel enablement of the tracking device to receive and initiate certain limited and useful operations of the stolen or missing computing assets to prevent unauthorized use of its digital content.

U.S. Patent Publication No. 2004/0198309 discloses a stolen vehicle tracking and recovering method that utilizes cellular telecommunication networks for providing location guidance information to improve vehicle recovery. An improvement of the present invention over the prior art is its use of an implanted GPS device within a portable computing device that communicates directly with a global positioning satellite network and independently of the operating system of the portable computing device.

In U.S. Patent Publication No. 2003/0005316, the prior art teaches a mobile system that is provided with a theft recovery mechanism comprising a host chipset and a locator subsystem connected to the host chipset that is arranged to determine a current location of the mobile system; and a main storage connected to the host chipset and arranged to store an operating system (OS) and contain an OS-Present application and/or a Pre-OS application configured to enforce security policies during user authentication and determine whether the mobile system may have been stolen or used inappropriately based on the security policies. A novel improvement of the present invention is its use of an implanted autonomous device that coordinates theft and tracking functions separate from an existing computing operating system. This improvement provides a measure of security from programming interference or compromise by software viruses that can attack and compromise mobile device operating systems.

In U.S. Pat. No. 5,793,283, titled "Pager Vehicle Theft Prevention and Recovery System", the prior art teaches a theft prevention and recovery system using pager network for vehicles, which transmits a designated electronic alarm signal via free space through an electronic transceiver when a remote alarm activation signal is received. The user instructs the transceiver to transmit a continuous pager signal containing longitudinal and latitudinal coordinates generated by the GPS. The longitudinal and latitudinal coordinates allow the car to be traced and recovered. The present invention is distinguished from this prior art because its mode of operation configures to the unique parameters of a personal computing system, which contains data files. In the event of a loss or theft of the personal computing system, a novel improvement of the present invention is that it can determine and activate procedures on the data files if such data files must be cordoned off, destroyed, encrypted or transmitted to a remote and secure location.

Other prior art is disclosed in U.S. Patent Publication No. 2007/0180207, which involves secure radio frequency identification (RFID) backup/restore for computing/pervasive devices. This prior art uses an automated RFID based data backup and recovery system for a computing device to invoke logic to initiate physical copying and transmission of digital storage device content to remote storage device. The present invention is distinguished by its separate universal GPS device that is installed in a portable computing device. Further the present invention requires positive activation by the user and can trigger disablement of the host computing device to prevent economic loss related to a potential disclosure breach of proprietary, personal or commercial data.

In U.S. Patent Publication No. 2006/0033616, titled "Smart Container Gateway", the prior art comprises a smart container gateway that provides communication with global and local networks, container and cargo security sensors and cargo identification tags. The smart container gateway communicates with one or more networks by means of an integrated structural RF antenna, power generator and radio control subsystem. The present invention is distinguished in that its application requires insertion of a compact and covert device into the interior space of the portable computing device and requires external power from the host device and external activation prior to performing or activating to perform any function.

In U.S. Patent Publication No. 2005/0017900, titled "Tracking Unit", the prior art describes a tracking unit for assisting in the recovery of stolen monies or other property includes a housing containing a GPS receiver for receiving GPS signals from overhead satellites, a cellular phone transceiver, a microprocessor, and a battery. Following a theft, the microprocessor activates the cellular phone transceiver to dial the telephone number of a central monitoring station. The present invention is distinguished in that it is directly installed into the theft risk (i.e. the portable computing device) in which it is installed.

In U.S. Patent Publication No. 2004/0075539, titled "Vehicle Monitoring System", the prior art discloses "remote theft monitoring for vehicle by sensing vehicle displacement, engine operation and key entry." When a possible theft condition is determined, the service provider server will generate a message to alert a security agency. The present invention disclosure is distinguished by its use in portable computing devices and its requirement for active external activation by an owner to operate its novel features and benefits.

In U.S. Pat. No. 6,049,269, titled "Wide Area Wireless System for Access Into Vehicles and Fleets for Control, Security, Messaging, Reporting and Tracking", the prior art invention uses a paging signal initiated by owner if his or her vehicle is stolen, on-board paging receiver, decoder, controller, alarm and ultimate disablement of vehicle. The present invention is an improvement in its use of a novel software based method that employs an insertable GPS device into portable computing devices. In the present invention, a novel software based method computes a GPS system purchase price related to the savings from economic loss by recovery or by cash compensation in the event of an unrecoverable loss of said portable computing device.

Notwithstanding the prior art discussed herein, the invention is novel because none of the prior disclosures either alone or in combination are sufficient to disclose the invention set forth in this application. As a result, the present invention offers numerous advantages over the prior art, including, without limitation:

a) The claimed invention discloses a novel and useful GPS device and antennae system that may be covertly and efficiently installed into a portable computing device.

b) The invention is a novel means to employ software in the GPS device that may instruct the portable computing device to transmit, alter or destroy data files in the portable computing device to prevent loss of economic value or personal privacy.

c) The invention is a novel software based method and financial system to acquire and install such a GPS device and software and to provide an insurance product to compensate for loss by the theft of or accidental loss of portable computing devices. From the discussion that follows, it will become apparent that the present invention addresses the deficiencies associated with the prior art while providing numerous additional advantages and benefits not contemplated or possible with prior art constructions.

SUMMARY OF THE INVENTION

A location-based recovery device and risk management system for portable computing devices and data is disclosed herein. The location-based recovery device and risk management system both protects data stored on portable computing devices and assists in the location and recovery of portable computing devices that have been stolen or otherwise lost. The stored data may be overwritten or encrypted for later decryption when the portable computing device is recovered. In this manner, such data is protected even when the portable computing device is lost.

Various embodiments of the location-based recovery device and risk management system are disclosed herein. For instance, in one exemplary embodiment, the location-based recovery device and risk management system may be a portable computing device comprising a power source configured to allow operation of the portable computing device without being connected to an electrical outlet, a data storage assembly configured to store one or more data files on the portable computing device, and a wireless communication assembly.

The wireless communication assembly may be configured to receive one or more wireless signals to determine a geographic location of the portable computing device, receive input indicating the theft or loss of the portable computing device, and transmit the geographic location of the portable computing device after receiving the input indicating the theft or loss of the portable computing device.

Upon receiving one or more particular wireless transmissions, the data storage assembly modifies the data files utilizing a random binary fill or encryption that is capable of decryption if the portable computing device is recovered. This protects the data files on the portable computing device. It is contemplated that the particular wireless transmissions may only be transmitted by an authorized user of the portable computing device.

It is noted that the wireless communication assembly may have various configurations. For example, the wireless communication assembly may comprise a GPS device, a cellular data transceiver, a Wi-Fi data transceiver, or various combinations thereof in one or more embodiments.

In another exemplary embodiment, the location-based recovery device and risk management system may be a data protection and recovery system for a portable computing device (e.g., a laptop, tablet, or smartphone). Such system may comprise one or more communication devices configured to send one or more transmissions to the portable computing device indicating the theft or loss of the portable computing device, wherein the portable computing device is configured to, upon receipt of one or more particular transmissions, modify data stored thereon utilizing a random binary fill or encryption that is capable of decryption if the portable computing device is recovered. The communication devices will typically also be configured to receive a response from the portable computing device indicating the geographic location of the portable computing device.

A user interface of the system may query a user whether to activate data file management on the portable computing device. Upon receiving user input activating data file management, the communication devices transmit the particular transmissions thereby causing the portable computing device to modify the data stored thereon utilizing a random binary fill or encryption that is capable of decryption if the portable computing device is recovered. The particular transmissions may be received wirelessly by the portable computing device. It is noted that the communication devices may be further configured to transmit one or more instructions to the portable computing device to decrypt encrypted data store thereon.

The user interface may be further configured to query the user whether to activate file management comprising the random binary fill or encryption that is capable of decryption if the portable computing device is recovered. In addition, it is contemplated that the user must be an authorized user of the data protection and recovery system in order to utilize the system's capabilities.

Various methods for data protection and recovery for a portable device are disclosed herein as part of the location-based recovery device and risk management system as well. For instance, in one exemplary embodiment, a method for data protection and recovery for a portable device may comprise providing a data storage device configured to store data on the portable device and to modify the stored data utilizing a random binary fill or encryption that is capable of decryption and data recovery if the portable device is recovered, and wirelessly receiving input indicating the theft or loss of the portable computing device via a signal reception and transmission assembly of the portable computing device. Upon receiving the particular wireless transmissions, a geographic location of the portable computing device is determined and reported to a user via the signal reception and transmission assembly.

In the method, modification of the stored data utilizing a random binary fill or encryption that is capable of decryption and data recovery if the portable device is recovered is conditioned upon receipt of one or more particular wireless transmissions by the signal reception and transmission assembly.

It is noted that the method may further comprise installing a GPS device, cellular data transceiver, Wi-Fi data transceiver, or various combinations thereof in the portable device as part of the signal reception and transmission assembly. Similar to above, it is contemplated that the particular wireless transmissions may only be transmitted by an authorized user of the portable device.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 1A is a frontal plane view of GPS tracking device to be installed in a portable computing device;

FIG. 1B is a back plane view of a GPS tracking device to be installed in a portable computing device;

FIG. 1C is a side plane view of a GPS tracking device to be installed in a portable computing device.

DETAILED DESCRIPTION OF THE PREFERRED EMBODIMENTS

Figure 1A:
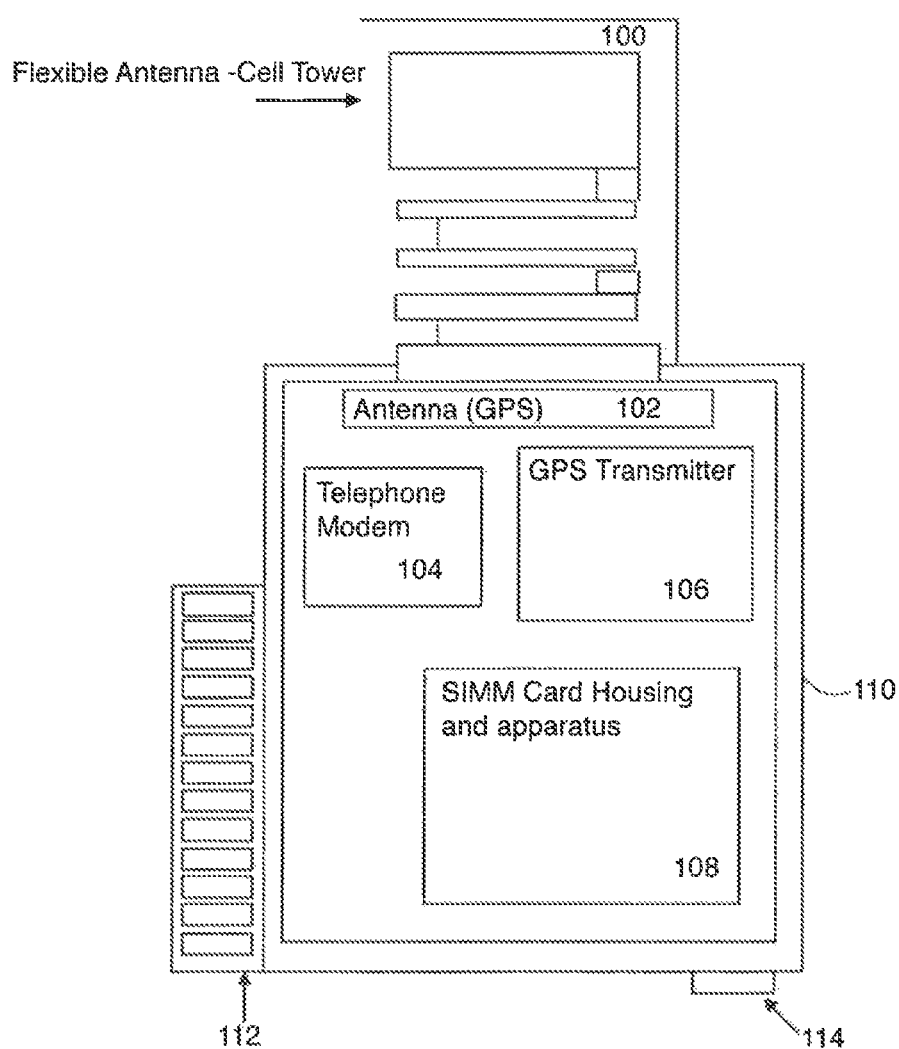
FIGS. 1A-1C are exemplary schematics illustrating the elements of the invention device in various view planes that demonstrate the composition of electrical and structural elements necessary for installation into a portable computing device.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Due to the growth of the Information Technology (IT) infrastructure and general decrease in costs and sizes of GPS device components, there has been a growing demand for GPS implementation within portable assets, such as portable computing devices. As individuals and enterprises expand the use of portable computing devices such as with laptop, tablet, and handheld computers (e.g., smartphones), there has been an increasing recognition of the vulnerability such devices have for theft or loss and the corresponding increase in economic value and corresponding loss when theft or loss occurs. For example, of the more than 10,000 laptops that go missing every month at Chicago O'Hare Airport, approximately only 22% are ever recovered.

A problem in the prior art has been an inability to configure and fabricate GPS devices that were compact enough to conveniently install on portable computing devices. A further problem is the inability to configure an embedded antennae configuration with such a compact GPS device that will reliably transmit such signals usable by a GPS tracking network for device recovery in the event of theft or loss. A still further problem has been a lack of means to configure such GPS devices for simple, rapid and covert installation into existing portable computing devices that will be both efficacious yet difficult to detect and disable by thieves. A still further problem in the prior art is the lack of an enabling system to instruct the installed GPS device in a portable computing device to instruct the computing device to transmit, alter or destroy stored data files to prevent economic loss or breach of privacy rights. A still further problem is the lack of a suitable business method and process to price, acquire and install such GPS devices, concurrent with a method to price and provide a risk management financial instrument to compensate a purchaser for potential the risk of loss and impairments occasioned by the irrecoverable or partial recovery of portable computing devices and data therein installed.

Currently, GPS is a fast-growing field. For instance, cell phones currently have the ability to have GPS on them, as do automobiles, thereby giving GPS products off-the-shelf availability. However, in the present invention, the device's solutions and implementation, and the size of the unit make it unique. In addition, the present invention includes a novel, computationally based recovery replacement program that utilizes a generated insurance service to mitigate the risks and costs associated with theft and loss of portable computing devices.

Therefore, a first object of the present invention is to disclose a novel and useful GPS device and antennae system that may be covertly and efficiently installed into a portable computing device through the memory slots on the motherboard.

A second further object of the invention is to disclose a novel means to employ specific software (referred to herein as "Silver Bullet software") in the GPS device that may independently instruct the portable computing device to transmit, alter or destroy data files in the portable computing device to prevent loss of economic value or personal privacy through the unique coding of the Silver Bullet software application.

A third further object of the present invention is to disclose a novel computerized and enabled method to acquire and install such a GPS device and software and to provide a computer generated insurance product to compensate for accidental loss or theft of such portable computing devices.

Figure 1B:
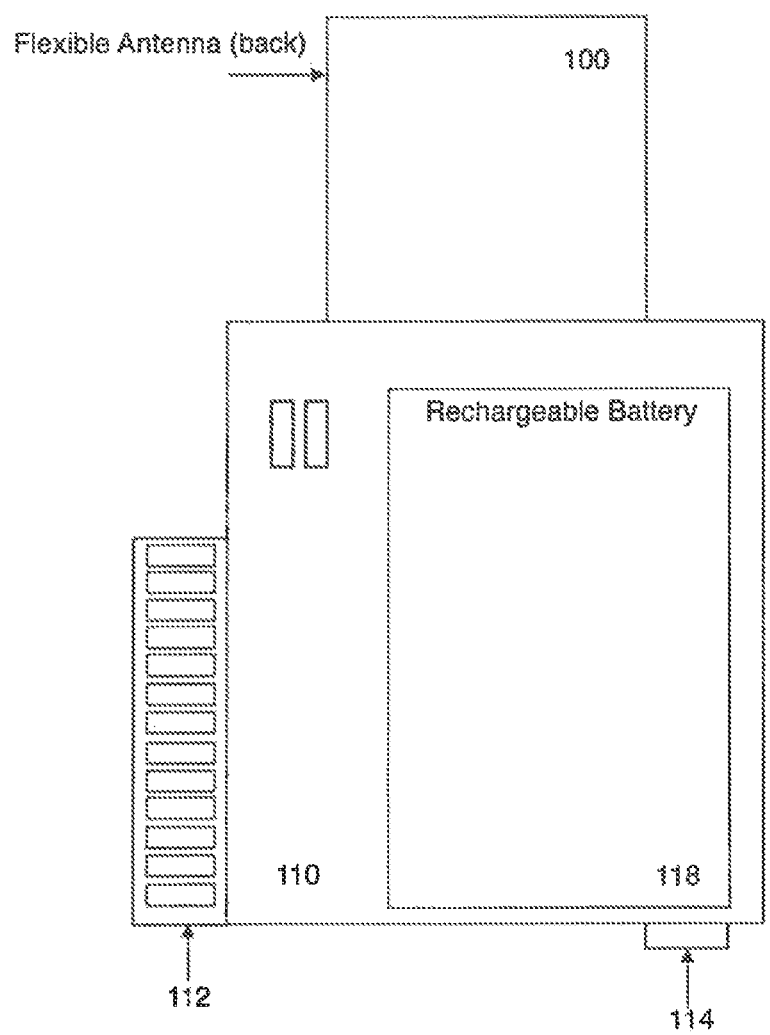
Figure 1C:
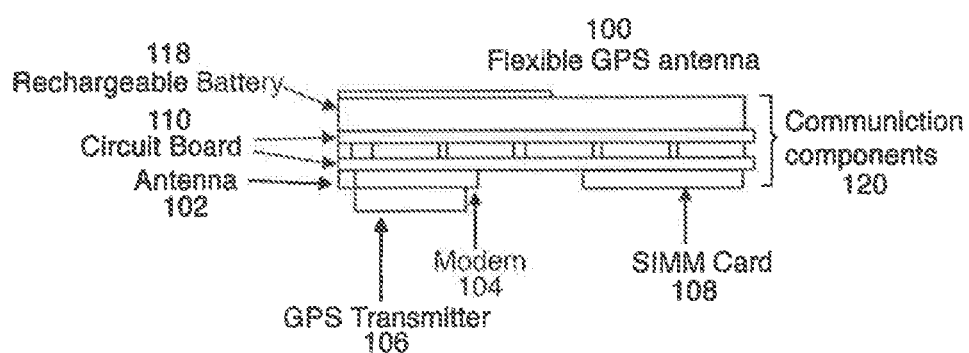

The present invention is embedded into the portable computing device via au open card slot on the motherboard of said portable computing device, which is respectively illustrated in the diagrams of FIGS. 1A, 1B, and 1C. In a preferred embodiment, the device is always powered on, even when the portable computing device is not plugged in. The power drain is minimal due to the fact the device is in "sleep mode" and allows for a SMS message to be sent to the device on demand and therefore locating the portable computing device with accuracy within 5 meters.

Unlike prior art products that are required to be connected to the Internet, the present invention can be located on demand regardless of whether or not the portable computing device is plugged in or connected to the Internet. A SMS text message is sent to the device and it responds with longitude/latitude parameters of its locations. These parameters are entered into a mapping software system and locate the device and display its location on a map of the area within 5 meters of accuracy.

In contrast, prior art devices are typically embedded into the systems BIOS and can only be located from internet "hotspots" such as Starbucks coffee, bookstores and other wired locations, etc. This means the portable computing device can only be located from an internet connection in which it is connected therefore no on demand capability exist with the prior art products and, therefore, are less accurate.

The present invention incorporates other novel features as well. For example, if desired by the owner, a transmitted message to the Silver Bullet software can be sent to and through the present invention to destroy the data contained on the hard drive rendering the portable computing device useless. The Silver Bullet software function will issue a command to the present invention that will activate a binary overwrite command that will fill the entire hard drive with 1's and 0's rendering the portable computing device useless and even unable to boot up since the operating system will also be overwritten. Prior art products do not offer or anticipate this capability.

Furthermore, in the unlikely event the portable computing device is not recovered within a definite time (e.g., 15 calendar days), the risk management process of the present invention will electronically commence an order, payment and shipment process to replace the portable computing device with a comparable product of like, kind and quality or better. Additionally the risk management process can also electronically provide compensation to the owner for the lost economic value of the data files stored on the unrecovered portable computing device.

It will be obvious to one skilled in the art that the invention may take numerous forms of device and system configurations that will accommodate a diversity of covert GPS tracking devices, portable computing devices, and electronically implemented, software-based insurance and purchase business systems. What follows is a preferred embodiment of the useful novelties of the present invention. However, for one skilled in the art it will be obvious that the novel features disclosed herein may be employed with equal utility to alternate configurations of the invention elements.

The disclosed invention is the GPS personal tracking and recovery device used inside of laptops and other types of portable computing devices. In a preferred embodiment with this type of system, a battery or power source is required. If the device is charged using its internal battery it typically has four hours of run time and three days of standby time. However, if the invention device is charged using the laptop power source in which the invention device was installed, that device can operate efficiently using inside power as long as that power is available. In some cases, people will disconnect the power and/or repackage. However, when it becomes time to re-engage power, the invention device will begin transmitting again and has been set on a protocol that allows the user to continue to transmit immediately. If somebody attempts to change the exterior of the portable computing device, the invention's embedded chip will still react.

Referring now to FIG. 1A, the exemplary invention is shown in frontal plane view. At 100 the flexible antenna for GMS transmission is displayed. At 102, a GPS antenna is displayed. A telephone modem 104 provides for reception and transmission of software enabled data and instructions between the invention device and a remote invention user. A GPS transmitter 106 enables the invention device to transmit and obtain location signals from a GPS/GSM array. A SIMM card housing and apparatus 108 together with the modem 104, antennae 102, 100 and the GPS transmitter 106 are affixed and communicate with a circuit board 110. In the present embodiment, the circuit board 100 is in signal communication with the computing element of portable computing device through a connector rail 112. The circuit board 110 has an electric power connection with the portable computing device at 114.

Referring now to FIG. 1B is a back plane "through view" of the exemplary invention which was previously referenced in FIG. 1A. The invention illustrated in FIG. 1B maintains the same orientation as FIG. 1A and the observer views the back plane view through the front plane orientation. The conspicuous feature of FIG. 1B is a rechargeable battery element 118, affixed to the circuit board 110, which communicates with external recharging power through the battery recharge port at 114.

Referring now to FIG. 1C is an alternative side view of the invention device illustrating an alternative positioning of some of the invention device elements. More specifically, the circuit board 110 is shown housing various communication circuit elements 120 within the circuit board 110 itself. The flexible antenna 100 is mechanically affixed to the rechargeable battery 118. The connector rail 112 and battery recharge port elements are deliberately omitted in the plane view to highlight other invention elements. However, for one skilled in the art such alternate assemblies are well understood and frequently used to minimize overall device size and/or connection compatibility to the portable computing device. Further, flexibility in the invention device element assembly lends itself to covert design in either imitation of other circuit elements or compact size. Either option is novel and useful in preventing invention device tampering or detection.

For this exemplary application, the invention tracking device will be used inside of a laptop computing device, deriving its power source directly from said computer's battery source as shown at 114 in FIGS. 1A and 1B respectively. The invention device allows the laptop owner to use either a desktop computer, a third party tracking service and/or a cellular phone for immediate tracking capability. Additionally, once the invention device registers the laptop as missing, an owner has the ability to initiate regular monitoring whereby, for example, the installed device can transmit a location, based upon plain sight, every two minutes up to every 24 hours.

This invention's tracking device is useful because of the fact that there is a high theft and low recovery rate of laptops. An additional novel benefit is that this invention device can be used in almost any type of device which utilizes an AC/DC power source and which can be converted to the 12-volt standard typically required. The usefulness of this device is self-evident with the ability to recover misplaced or stolen products through the ability to have immediate real-time access based upon GPS satellite transmission.

Figure 2:
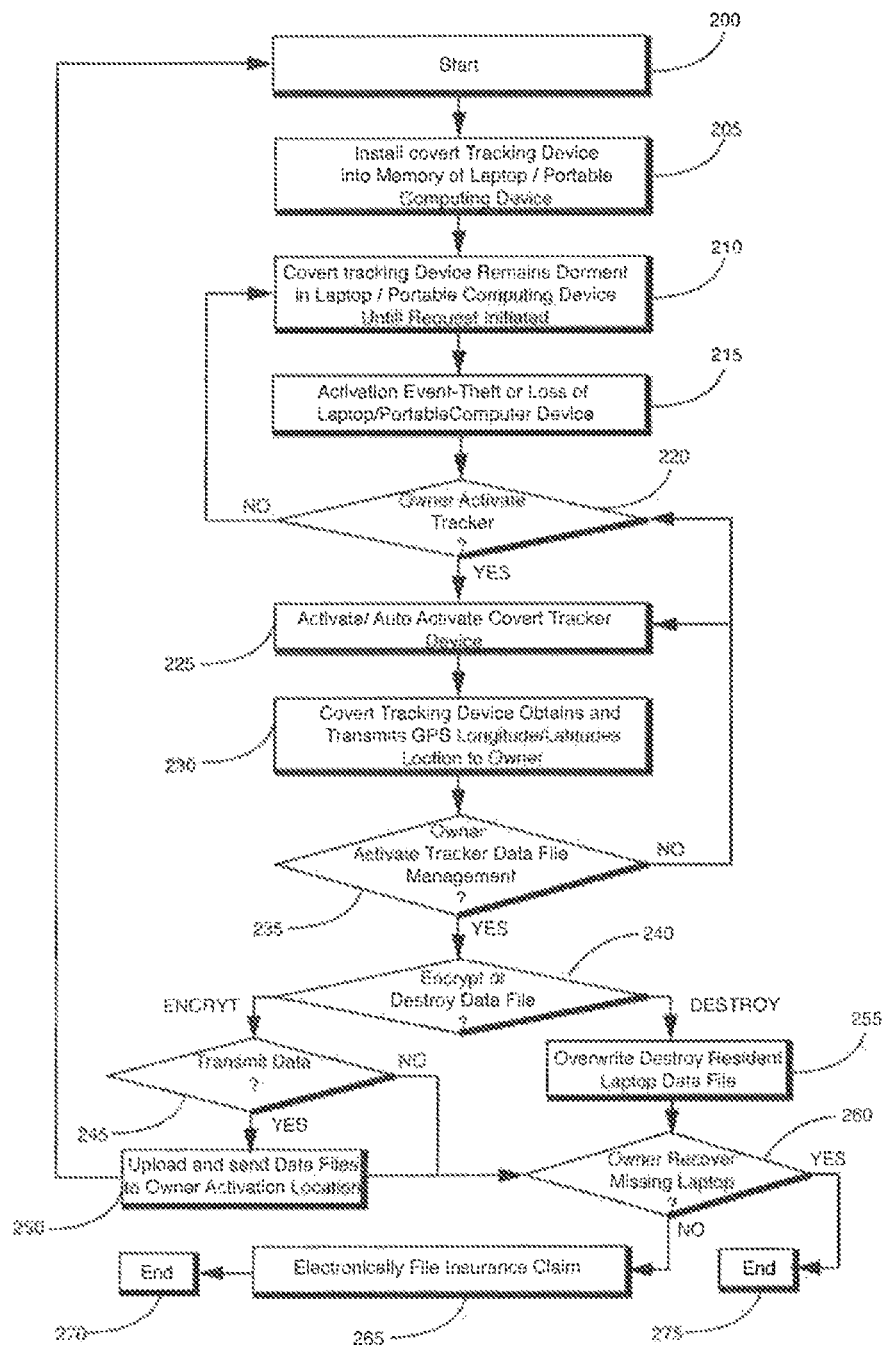
FIG. 2 is an exemplary process and software block flow diagram for use of the installed exemplary device of FIGS. 1A-C in the event of theft or loss of the portable computing device to which the device is covertly affixed.

FIG. 2 is a block diagram indicating an exemplary software enabled process utilizing the tracking device. Such a process starts 200 with physical installation of the device at a step 205, referenced in FIGS. 1A-C. Concurrently at step 205, the software components are installed in the invention device and a covert tracker device 225 such as a desktop computer, cellular phone or a telecommunications service provider system. The enabled covert tracking device system remains dormant at a step 210 until activation by a transmitted request from the owner or authorized user to an operational covert tracker device. An activation of the installed device at a step 215 results in a query at a decision step 220 on whether to activate the tracking program routine. A "no" response at decision step 220 returns the installed device to a dormant mode at step 210. A "yes" at decision step 220 requires manual activation of the software elements to activate tracking operations at a step 225 through transmission and detection of GPS location coordinates at a step 230. Upon activation, the owner or authorized user is queried as to whether to commence data file management via the installed tracker device at a decision step 235. A "no" at decision step 235 returns either to the decision step 220 tracker query option or to automated tracking at step 225 that continues periodic detection and transmission of GPS location coordinates. A "yes" at decision step 235 is indicative of a threat that data on the portable computing device is at risk of unauthorized use or unacceptable loss. A "yes" at decision step 235 thus queries the owner or authorized user to encrypt or destroy portable computing device data files at a decision step 240. If the "destroy" option is authorized, the invention initiates its Silver Bullet software routine to overwrite and destroy portable computing device data files. It will be obvious to one skilled in the art that the Silver Bullet software may also be used to uninstall or disable stored software programs, protocols or operating systems deemed proprietary and a cause of economic loss in the event of loss or imminent unauthorized use of the portable computing device. If the encrypt option is selected at decision step 240 then the owner/authorized user is queried whether to transmit such data files at a decision step 245. If a "yes" occurs at decision step 245 then the installed tracking device uploads and sends such files to the activation location at a step 250. If an owner successfully recovers the portable computing device at a decision step 260, the tracking routine ends and the system is returned to its initial settings of the dormant state at step 210. If the laptop or data are not recovered within a definite time at decision step 260, the owner then electronically files an insurance claim at a step 265, which makes compensation to the owner for loss. Upon replacement of the lost hardware, the user process returns to step 205 for installation and protection of the replacement device.

Figure 3:
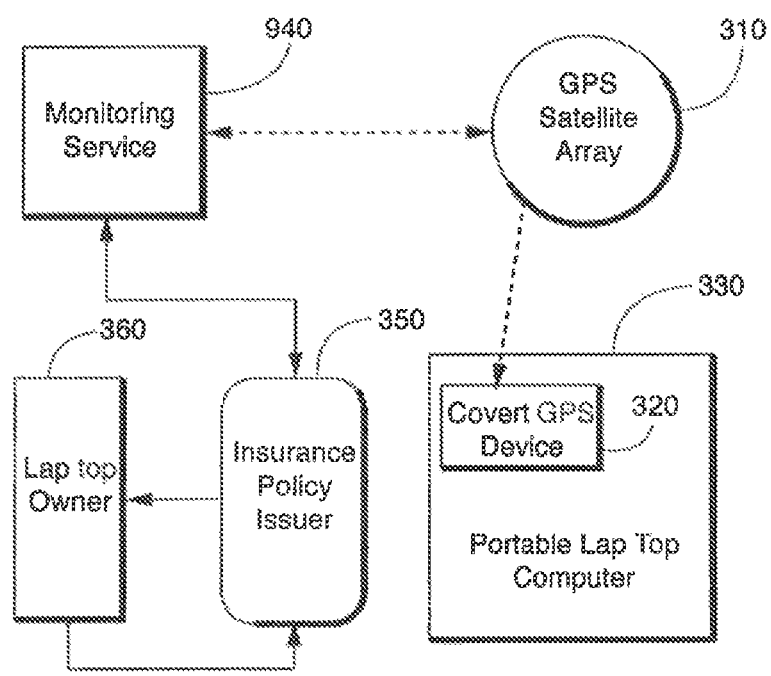
FIG. 3 is a block diagram illustrating a preferred embodiment of the method and system disclosed by the present invention which respects to, purchase, registration, signal generation, tracking and control of the installed exemplary device of FIGS. 1A-1C.

Referring now to FIG. 3, a preferred embodiment of the method of the present invention is shown. A laptop computer owner 360 who will own or owns a portable laptop 330 will procure the covert GPS device 320 in connection with a purchase agreement that incorporates an insurance policy related to a future event involving theft or loss of laptop 330. The policy will be produced using a novels series of software algorithms that utilize, without limitation, a plurality of data inputs; the cost of GPS device 320, the cost of installation of GPS device, the cost of monitoring service 340, the cost of communications from monitoring service to GPS satellite array 310, the cost of communication of the GPS satellite with covert GPS device 320, a future time based value of information and data maintained or to be maintained on laptop 330 for which owner 360 will be compensated in the event of theft or loss of laptop. The payments made by laptop owner 360 to insurer 350 may be a lump sum or a series of fixed or variable payments. The covert GPS device 320 will be installed by a certified contractor and will place the covert device into laptop 330 in a manner that makes it difficult to recognize the covert device as other than the normal hardware of laptop. The contractor will also connect the covert device power receptacle to the power system of laptop 330. The contactor will enable an anti tampering feature of covert GPS device 320 to trigger an alarm or automatic transmission signal as part of the security protection features of the invention. The covert GPS device 320 will be electronically enabled using embedded software algorithms that may also be encrypted to provide security to the owner 360 and an identifier code for monitoring service 340 and GPS satellite array 310. In the event of a theft or loss of laptop 330, owner 360 will communicate the event to insurer 350. Insurer 350 will communicate with service 340 to initiate a tracking algorithm to locate laptop 330. Alternately, the owner 360 call report will be automatically forwarded to monitoring service 340. GPS device 320 will receive an enabling transmission from GPS Satellite 310 and commence periodic GPS location emissions using power derived from laptop 330 power source.

In a further variation of the invention, the monitoring service 340 will manually or automatically transmit to the GPS satellite array 310 an authorization for covert device 320 to initiate a wireless data transmission of files stored on laptop 330 to secure files managed by the monitoring service 340. These files will be forwarded under secure transmission or recorded on to a suitable data storage medium for physical delivery of such data files stored on laptop 330 to owner 360. In a still further variation of the invention the instructions regarding data stored on laptop 330 may instruct the laptop to alter or eradicate such stored files.

In summary and without limitation, the invention is comprised of the following elements:

A first element consisting of fabricating an installed covert tracking device further comprised of circuit, electronic and power elements as shown in FIGS. 1A, 1B, and 1C that is compatible with the portable computing device into which it is installed;

A second element where said covert tracking device is acquired in conjunction with a software generated insurance policy and tracking system to mitigate the risk of loss of a portable computing device into which said covert tracking device is installed;

A third element of installing the covert tracking device covertly inside the portable computing device and further attaching it to the power source and/or battery of said portable computing device where said tracking device itself does not rely on any functions from the portable computing device and is stand-alone other than the power source;

A fourth element where, once the tracking device is installed in the portable computing device, and in the event for whatever reason the portable computing device is misplaced and or stolen, an owner of the lost portable computing device will have the ability to telecommunicate to activate a recovery protocol utilizing the tracking features of the covert tracking device;

A fifth element where recovery of all portable computing devices using this tracking device invention is based upon real-time GPS locations and, in the event recovery is not immediate, the tracking device itself receives a communication that allows the tracking device to power on and regularly source and transmit GPS location data until actual recovery or determination of an unrecoverable loss of said portable computing device.

A sixth element where a portable computing device being misplaced or stolen, a certain minimum time must lapse (e.g., 5 days) before it is deemed unrecoverable. If the portable computing device is not recovered within the lapsed period, a risk management underwriter will be obligated, through said insurance policy, to replace the unrecovered portable computing device together with a compensable sum for the economic loss of proprietary data files.

It will be obvious to one skilled in the art that this invention device, method and process apply to numerous other types of portable computing devices. The immediate invention opportunity appears to be with laptops, as there is apparently a unique and unmet need to mitigate sensitive and valuable data storage and restriction issues in the event of loss or theft of the portable computing device.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A method for monitoring a portable computing device, the method comprising:
   receiving an alert signal at a wireless communication assembly that is communicatively coupled to a global positioning device installed in the portable computing device, the alert signal indicative of a loss of the portable computing device;
   determining a location of the portable computing device based on one or more communications received by the global positioning device from one or more global positioning satellites;
   periodically updating the location of the portable computing device according to a predetermined time interval; and
   periodically transmitting a location signal according to the predetermined time interval to a second device through the wireless communication assembly in response to receipt of the alert signal at the wireless communication assembly, the location signal identifying the location of the portable computing device.

2. The method of claim 1, further comprising receiving the predetermined interval at the wireless communication assembly.

3. The method of claim 1, further comprising preventing access to one or more files stored in a memory of the portable computing device in response to receipt of the alert signal at the wireless communication assembly.

4. The method of claim 3, wherein preventing access to the one or more files includes at least one of erasing or overwriting the one or more files.

5. The method of claim 3, wherein preventing access to the one or more files includes encrypting the one or more files.

6. The method of claim 3, further comprising waiting for a second predetermined time interval following receipt of the alert signal at the wireless communication assembly before preventing access to the one or more files.

7. The method of claim 5, further comprising:
   receiving a decryption signal at the wireless communication assembly, the decryption signal including a cryptographic key code; and
   decrypting the encrypted one or more files using the cryptographic key code.

8. The method of claim 3, wherein the one or more files include at least one of an electronic data record, a software program, or an operating system.

9. A system for monitoring a portable computing device, the system comprising:
   a global positioning device that is installed in the portable computing device, wherein the global positioning device determines a location of the portable computing device based on one or more communications received by the global positioning device from one or more global positioning satellites, and wherein the global positioning device periodically updates the location of the portable computing device according to a predetermined time interval; and
   a wireless communication assembly that is communicatively coupled to the global positioning device, wherein the wireless communication assembly receives an alert signal indicative of a loss of the portable computing device, wherein the wireless communication assembly periodically transmits a location signal according to the predetermined time interval to a second device through the wireless communication assembly in response to receipt of the alert signal at the wireless communication assembly, the location signal identifying the location of the portable computing device.

10. The system of claim 9, wherein the wireless communication assembly receives the predetermined interval.

11. The system of claim 9, further comprising a memory interface of a memory of the portable computing device, the memory storing one or more files, wherein the memory interface prevents access to the one or more files in response to receipt of the alert signal at the wireless communication assembly.

12. The system of claim 11, wherein the memory interface prevents access to the one or more files by at least one of erasing or overwriting the one or more files.

13. The system of claim 11, wherein the memory interface prevents access to the one or more files by encrypting the one or more files.

14. The system of claim 11, wherein the memory interface waits for a second predetermined time interval following receipt of the alert signal at the wireless communication assembly before preventing access to the one or more files.

15. The system of claim 13, wherein the wireless communication assembly further receives a decryption signal after encryption of the one or more files, the decryption signal including a cryptographic key code, and wherein the memory interface decrypts the encrypted one or more files using the cryptographic key code.

16. A non-transitory computer-readable storage medium having embodied thereon a program executable by a processor to perform a method for monitoring a portable computing device, the method comprising:

receiving an alert signal at a wireless communication assembly that is communicatively coupled to a global positioning device installed in the portable computing device, the alert signal indicative of a loss of the portable computing device;

determining a location of the portable computing device based on one or more communications received by the global positioning device from one or more global positioning satellites;

periodically updating the location of the portable computing device according to a predetermined time interval; and periodically transmitting a location signal according to the predetermined time interval to a second device through the wireless communication assembly in response to receipt of the alert signal at the wireless communication assembly, the location signal identifying the location of the portable computing device.

17. The method of claim 1, further comprising disabling use of a protocol at the wireless communication assembly in response to receipt of the alert signal at the wireless communication assembly.

18. The method of claim 1, further comprising disabling use of a software program at the portable computing device in response to receipt of the alert signal at the wireless communication assembly.

19. The method of claim 1, further comprising uninstalling a software program at the portable computing device in response to receipt of the alert signal at the wireless communication assembly.

20. The method of claim 1, further comprising:
identifying that portable computing device has been tampered with; and
transmitting a tamper signal to the second device via the wireless communication assembly, the tamper signal indicating that tampering with the portable computing device has been identified.

* * * * *